(12) United States Patent
Kopko

(10) Patent No.: US 10,739,045 B2
(45) Date of Patent: Aug. 11, 2020

(54) SYSTEMS AND METHODS FOR CONTROLLING A REFRIGERATION SYSTEM

(71) Applicant: Johnson Controls Technology Company, Plymouth, MI (US)

(72) Inventor: William L. Kopko, Jacobus, PA (US)

(73) Assignee: Johnson Controls Technology Company, Auburn Hills, MI (US)

(*) Notice: Subject to any disclaimer, the term of this patent is extended or adjusted under 35 U.S.C. 154(b) by 318 days.

(21) Appl. No.: 15/427,953

(22) Filed: Feb. 8, 2017

(65) Prior Publication Data

US 2017/0227263 A1    Aug. 10, 2017

Related U.S. Application Data

(60) Provisional application No. 62/293,676, filed on Feb. 10, 2016.

(51) Int. Cl.
*F25B 25/00* (2006.01)
*F25B 5/02* (2006.01)
*F25B 49/00* (2006.01)

(52) U.S. Cl.
CPC .............. *F25B 25/005* (2013.01); *F25B 5/02* (2013.01); *F25B 49/00* (2013.01);
(Continued)

(58) Field of Classification Search
USPC ......................................................... 62/184
See application file for complete search history.

(56) References Cited

U.S. PATENT DOCUMENTS 4,257,238 A * 3/1981 Kountz ................ F24F 11/0009
  62/176.3
5,970,729 A    10/1999 Yamamoto et al.
(Continued)

FOREIGN PATENT DOCUMENTS

CN    1137824 A    12/1996
CN    1463352 A    12/2003
(Continued)

OTHER PUBLICATIONS

Climaveneta Sustainable Comfort, Formula Free Cooling Line, Air Source Chiller Featuring Free Cooling Function, with Scroll and Screw Compressors, From 40 to 1321 kw, Mar. 2012, pp. 1-16.
(Continued)

*Primary Examiner* — Elizabeth J Martin
(74) *Attorney, Agent, or Firm* — Fletcher Yoder, P.C.

(57) ABSTRACT

A refrigeration system includes a free cooling system having an air-cooled heat exchanger, where the air-cooled heat exchanger includes a fan configured to move air over coils of the air-cooled heat exchanger to remove heat from a coolant flowing through the air-cooled heat exchanger, and a mechanical cooling system with a refrigerant loop that includes an evaporator, a compressor, and a condenser disposed along the refrigerant loop, where the compressor is configured to circulate a refrigerant through the refrigerant loop, and wherein the evaporator is configured to receive the coolant and transfer heat from the coolant to the refrigerant. The refrigeration system also includes a controller configured to adjust a fan speed of the fan up to a threshold fan speed, to initiate operation of the compressor when the fan speed reaches the threshold fan speed, wherein the fan speed and a compressor speed of the compressor are based at least on an ambient air temperature and a cooling load demand.

25 Claims, 7 Drawing Sheets

(52) U.S. Cl.
CPC ....... *F25B 2500/29* (2013.01); *F25B 2500/31* (2013.01); *F25B 2600/025* (2013.01); *F25B 2600/0251* (2013.01); *F25B 2600/0253* (2013.01); *F25B 2600/11* (2013.01); *F25B 2600/111* (2013.01); *F25B 2600/2507* (2013.01); *F25B 2700/1931* (2013.01); *F25B 2700/1933* (2013.01); *F25B 2700/2103* (2013.01); *F25B 2700/2106* (2013.01); *F25B 2700/21173* (2013.01); *Y02B 30/741* (2013.01); *Y02B 30/743* (2013.01)

(56) References Cited

U.S. PATENT DOCUMENTS

| | | | | |
|---|---|---|---|---|
| 6,155,062 | A | * | 12/2000 | Santarnecchi ......... B64D 13/08 62/158 |
| 6,640,561 | B2 | | 11/2003 | Roberto |
| 7,036,330 | B2 | | 5/2006 | Grabon et al. |
| 7,581,409 | B2 | | 9/2009 | Bailey et al. |
| 9,179,574 | B2 | * | 11/2015 | Canney ................ H05K 7/1497 |
| 2012/0125023 | A1 | * | 5/2012 | Kopko .................. F25B 25/005 62/113 |
| 2014/0230467 | A1 | * | 8/2014 | Noll ...................... F04C 23/001 62/89 |
| 2014/0260391 | A1 | | 9/2014 | Kopko |

FOREIGN PATENT DOCUMENTS

| | | |
|---|---|---|
| DE | 102009045719 A1 | 4/2011 |
| EP | 1855070 A2 | 11/2007 |
| JP | 2000046423 A | 2/2000 |
| JP | 2005249258 A | 9/2005 |
| JP | 2008075988 A | 4/2008 |
| JP | 2014035149 A | 2/2014 |
| JP | 2014126287 A | 7/2014 |
| KR | 20060128190 A | 12/2006 |

OTHER PUBLICATIONS

PCT International Search Report & Written Opinion for PCT Application No. PCT/US2017/017225 dated May 16, 2017, 16 Pages.

Japanese Office Action for JP Application No. 2018-541669 dated Sep. 5, 2019, 7 pgs.

Korean Office Action for KR Application No. 10-2018-7025080 dated Nov. 26, 2019, 10 pgs.

Chinese Office Action for CN Application No. 201780010146.6 dated Dec. 4, 2019, 14 pgs.

* cited by examiner

US 10,739,045 B2

SYSTEMS AND METHODS FOR CONTROLLING A REFRIGERATION SYSTEM

CROSS REFERENCE TO RELATED APPLICATIONS

This application claims priority from and the benefit of U.S. Provisional Application Ser. No. 62/293,676, filed Feb. 10, 2016, entitled "SYSTEMS AND METHODS FOR CONTROLLING A REFRIGERATION SYSTEM," the disclosure of which is hereby incorporated by reference in its entirety for all purposes.

BACKGROUND

The present disclosure relates generally to a refrigeration system. Specifically, the present disclosure relates to a refrigeration system that includes a free cooling system and a mechanical cooling system.

Refrigeration systems are used in a variety of settings and for many purposes. For example, refrigeration systems may include a free cooling system and a mechanical cooling system. In some cases, the free cooling system may include a liquid-to-air heat exchanger, which is used throughout industry and in many heating, ventilating, and air conditioning applications. The latter applications include residential, commercial, and industrial air conditioning systems. Additionally, the mechanical cooling system may be a vapor-compression refrigeration cycle, which may include a condenser, an evaporator, a compressor, and/or an expansion device. In the evaporator, liquid or primarily liquid refrigerant is evaporated by drawing thermal energy from an air flow stream and/or a cooling fluid (e.g., water), which may also flow through the liquid-to-air heat exchanger of the free cooling system. In the condenser, the refrigerant is de-superheated, condensed, and sub-cooled. In some cases, refrigeration systems may adjust a speed of a fan of the liquid-to-air heat exchanger and/or a speed of a compressor in the mechanical cooling system to meet a desired cooling demand.

DRAWINGS

DETAILED DESCRIPTION

Figure 1:
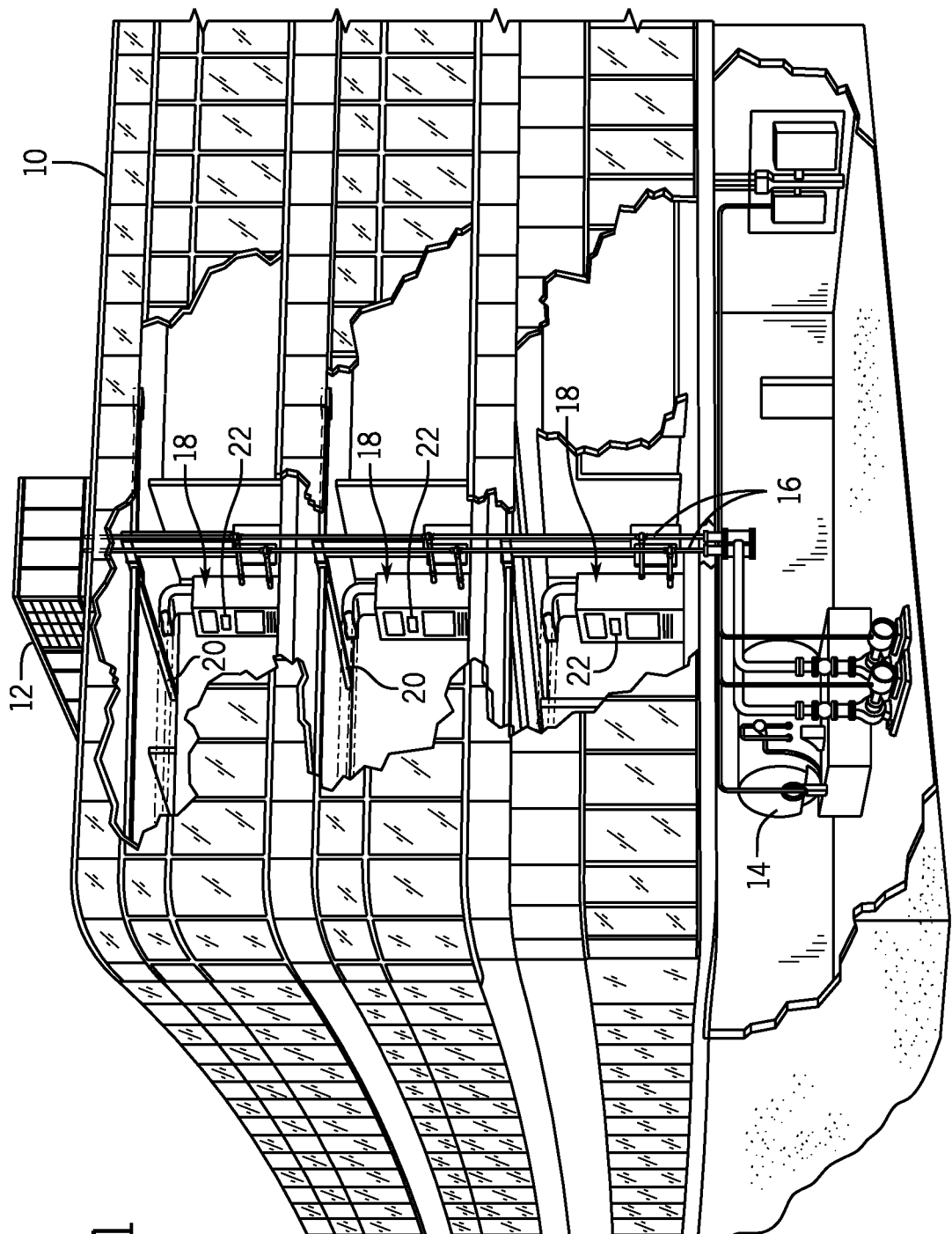
FIG. 1 is perspective view of an exemplary commercial or industrial environment that employs a refrigeration system, in accordance with an aspect of the present disclosure.

The present disclosure is directed to an enhanced control system for a refrigeration system that includes a free-cooling system and a mechanical cooling system for cooling a load. As used herein, a free-cooling system may include a system that places a fluid in a heat exchange relationship with ambient air. Accordingly, the free-cooling system may utilize the ambient air in a surrounding environment as a cooling and/or a heating fluid. The refrigeration system may utilize the free-cooling system alone (e.g., free-cooling mode), the mechanical cooling system alone (e.g., mechanical cooling mode), or the free-cooling system and the mechanical cooling system simultaneously (e.g., hybrid cooling mode). To determine which system(s) to operate, the refrigerant system may include various sensors and/or other monitoring devices that measure operating conditions (e.g., speed of fans, speed of a compressor, ambient air temperature, cooling fluid temperature) of the refrigeration system. For example, in accordance with embodiments of the present disclosure, determining which system(s) to operate may depend at least on a desired cooling load demand (e.g., a desired temperature of the load) and/or an ambient air temperature (e.g., a temperature of a surrounding environment of the refrigeration system).

Typically, refrigeration systems increase an air flow of the free-cooling system to a maximum air flow before operating the mechanical cooling system because it is generally believed that the free-cooling system consumes less power than the mechanical cooling system (e.g., a compressor of a vapor-compression refrigeration cycle). For example, a free-cooling system may include one or more fans that direct air toward a coil of a heat exchanger to cool a cooling fluid flowing through the coil. In order for the fans to operate, power is supplied to the one or more fans such that the air may flow over the coil and absorb heat from the cooling fluid. An amount of free-cooling performed by the free-cooling system may be adjusted by controlling a coil bypass valve with a number of fixed-speed fans running.

A mechanical cooling system may include one or more vapor-compression refrigeration cycles, where each vapor-compression refrigeration cycle includes an evaporator, a compressor, a condenser, and/or an expansion device. Refrigerant may be directed through the mechanical cooling system (e.g., a refrigerant loop) via the compressor, which may also be powered by a variable speed drive. The variable speed drive coupled to the compressor may enable control over a speed of the compressor, and thus an amount of cooling performed by the vapor-compression refrigeration cycle.

Typically, refrigeration systems operate a free-cooling system at maximum capacity (e.g., a maximum fan speed) before supplying power to the compressor of the mechanical cooling system because it is believed that the fans of the free cooling system consume less power than the compressor of the mechanical cooling system. Additionally, traditional refrigeration systems may continue to operate the free-cooling system at maximum capacity (e.g., at the maximum fan speed) when power is supplied to one or more compressors of the mechanical cooling system. Present embodiments seek to minimize an amount of power input to the overall refrigeration system (e.g., the free-cooling system and the mechanical cooling system) by increasing a speed of the fan (e.g., a variable speed fan) of the free-cooling system up to a threshold speed, where the threshold speed is below a maximum speed of the fan (e.g., a speed that the fan cannot physically exceed). In some cases, when the fan reaches the threshold speed (or before the fan reaches the threshold speed), power may be supplied to the compressor of the mechanical cooling system. Operating the refrigeration system in such a manner may minimize an amount of power supplied to the system, thereby enhancing an efficiency of the refrigeration system.

Turning now to the figures, FIG. 1 depicts an exemplary application for a refrigeration system. Such systems, in general, may be applied in a range of settings, both within the heating, ventilating, air conditioning, and refrigeration (HVAC&R) field and outside of that field. The refrigeration systems may provide cooling to data centers, electrical devices, freezers, coolers, or other environments through vapor-compression refrigeration, absorption refrigeration, and/or thermoelectric cooling. In presently contemplated applications, however, refrigeration systems may also be used in residential, commercial, light industrial, industrial, and in any other application for heating or cooling a volume or enclosure, such as a residence, building, structure, and so forth. Moreover, the refrigeration systems may be used in industrial applications, where appropriate, for basic refrigeration and heating of various fluids.

FIG. 1 illustrates an exemplary application, in this case a heating, ventilating, air conditioning, and refrigeration system (HVAC&R) for building environmental management that may employ one or more heat exchangers. For example, a building 10 is cooled by a system that includes a refrigeration system 12 and a boiler 14. As shown, the refrigeration system 12 is disposed on the roof of the building 10 and the boiler 14 is located in the basement; however, the refrigeration system 12 and the boiler 14 may be located in other equipment rooms or areas next to the building 10. The refrigeration system 12 is an air cooled device and/or a mechanical cooling system that implements a refrigeration cycle to cool water (or another cooling fluid, such as glycol). The refrigeration system 12 is housed within a single structure that may include a mechanical cooling circuit, a free cooling system, a controller, and associated equipment such as pumps, valves, and piping. For example, the refrigeration system 12 may be a single package rooftop unit that incorporates a free cooling system, a mechanical cooling system, and a controller. In some embodiments, the refrigeration system 12 may not include an external controller (e.g., connection ports for an external controller that controls other components of the building 10). In other words, the refrigeration system 12 is an autonomous unit (e.g., a packaged unit) that may be utilized to provide heating and/or cooling without additional components or controllers. The boiler 14 is a closed vessel that includes a furnace to heat water. The water (or another cooling fluid) from the refrigeration system 12 and the boiler 14 is circulated through the building 10 by water conduits 16. The water conduits 16 are routed to air handlers 18, located on individual floors and within sections of building 10.

The air handlers 18 are coupled to ductwork 20 that is adapted to distribute air between the air handlers 18 and may receive air from an outside intake (not shown). The air handlers 18 include heat exchangers that circulate cold water from the refrigeration system 12 and hot water from the boiler 14 to provide heated or cooled air. Fans, within the air handlers 18, draw air across coils of the heat exchangers and direct the conditioned air to environments within the building 10, such as rooms, apartments, or offices, to maintain the environments at a designated temperature. A control device, shown here as including a thermostat 22, may be used to designate the temperature of the conditioned air. The control device 22 may also be used to control the flow of air through and from the air handlers 18. Other devices may, of course, be included in the system, such as control valves that regulate the flow of water and pressure and/or temperature transducers or switches that sense the temperatures and pressures of the water, the air, and so forth. Moreover, the control devices may include computer systems that are integrated with and/or separate from other building control or monitoring systems, including systems that are remote from the building 10. It should be noted that while water is discussed as a cooling fluid, any suitable cooling fluid may be utilized in the refrigeration system 12.

Figure 2:
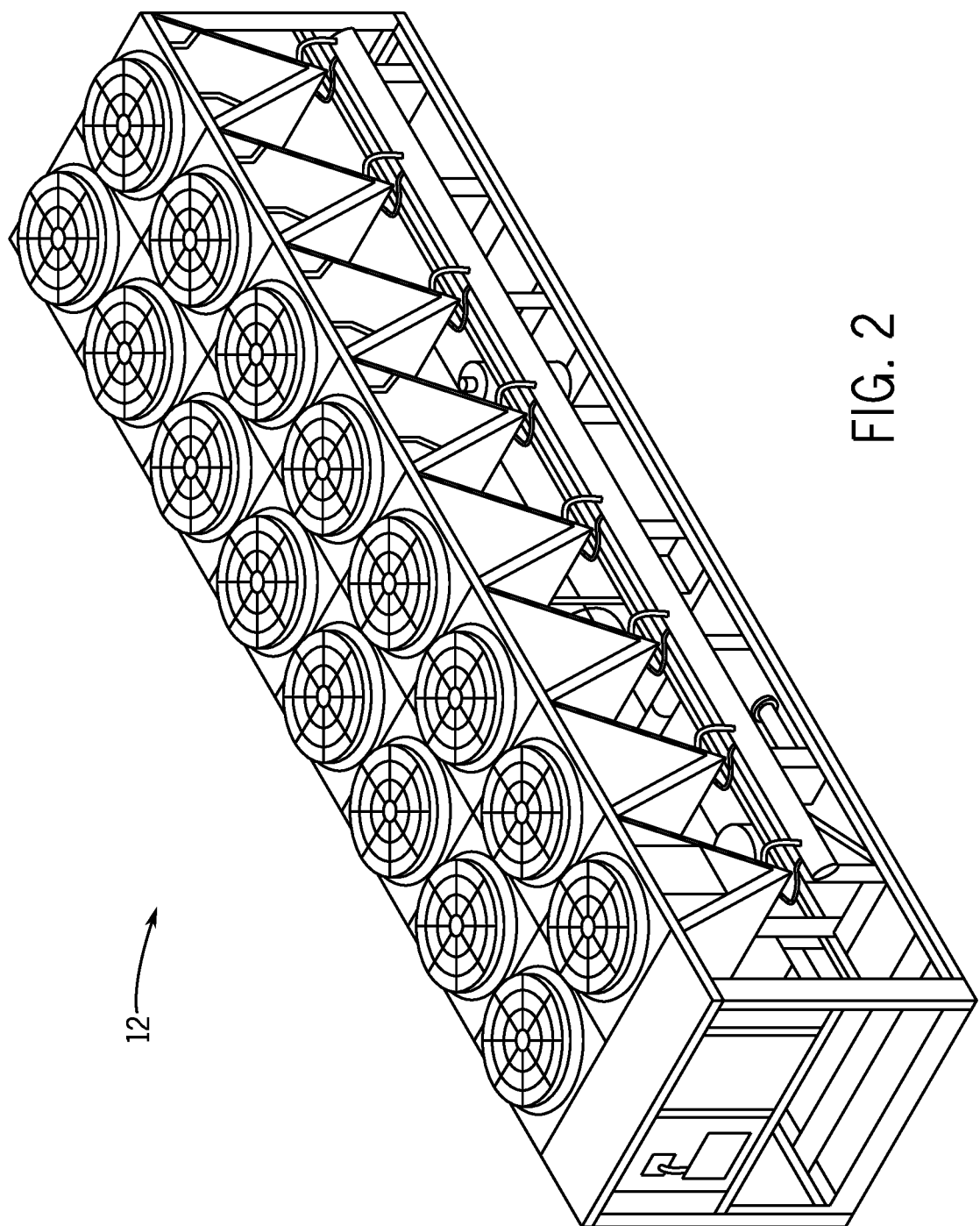
FIG. 2 is a perspective view of the refrigeration system of FIG. 1 that may include both a free cooling system and a mechanical cooling system to enhance efficiency of the refrigeration system, in accordance with an aspect of the present disclosure.

In accordance with embodiments of the present disclosure, the refrigeration system 12 may include a mechanical cooling system that may be modified and/or enhanced to include a free cooling system. For example, FIG. 2 is a perspective view of the refrigeration system 12 that may include both a mechanical cooling system (e.g., a vapor-compression refrigeration cycle) and a free cooling system to enhance an efficiency of the overall refrigeration system 12. In certain embodiments, the mechanical cooling system of the refrigeration system 12 may be an air-cooled variable-speed screw chiller similar to that of a YVAA chiller, as made available by Johnson Controls Incorporated. For example, the mechanical cooling system may be a two-circuit, variable-speed screw chiller with variable speed condenser fans (e.g., fans that may be used with one or more air-cooled heat exchangers). Additionally, the refrigeration system 12 may include a free-cooling system that may be utilized alone, or in combination with, the mechanical cooling system (e.g., a vapor-compression refrigeration cycle).

In certain embodiments, the refrigeration system 12 may include a control system configured to determine whether (and how) to operate the mechanical cooling system and/or the free cooling system based on a temperature of ambient air (e.g., air in a surrounding environment of the refrigeration system) and/or a cooling load demand (e.g., an amount of cooling demanded by a load). Accordingly, the refrigeration system 12 may operate the mechanical cooling system only (e.g., mechanical cooling mode), the free cooling system only (e.g., free cooling mode), or the mechanical cooling system and the free cooling system simultaneously (e.g., hybrid cooling mode) to meet the cooling load demand.

As discussed above, it may be desirable to minimize an amount of energy input to a refrigeration system 12 to maximize an efficiency of the refrigeration system 12 while achieving a desired cooling capacity of a load. In typical refrigeration systems, a speed of a fan of a free cooling system may be maximized before a compressor (e.g., a variable speed compressor) of a mechanical cooling system is activated in order to achieve a desired cooling load. However, it is now recognized that activating the mechanical cooling system compressor before a maximum speed of the fan is reached may consume less energy than operating the fan at its maximum speed before activating the mechanical cooling system compressor.

Figure 3:
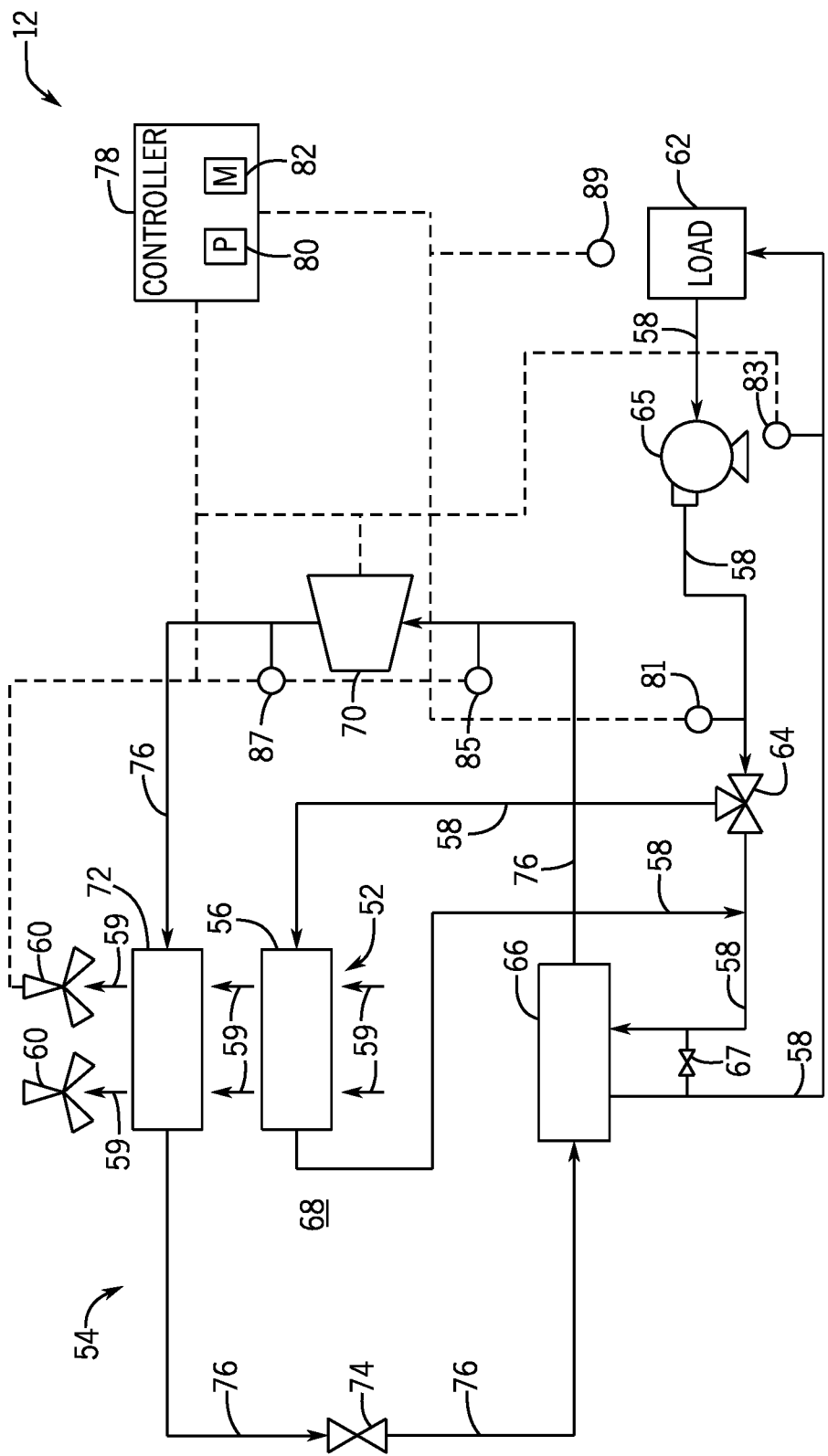
FIG. 3 is a block diagram of an embodiment of a refrigeration system, in accordance with an aspect of the present disclosure.

For example, FIG. 3 is a block diagram of the refrigeration system 12 that may be utilized in accordance with embodiments of the present disclosure. As shown in the illustrated embodiment, the refrigeration system 12 includes a free cooling system 52 and a mechanical cooling system 54 (e.g., one or more vapor-compression refrigeration cycles). The free cooling system 52 may include an air-cooled heat exchanger 56 that may receive and cool a cooling fluid 58 (e.g., water and/or glycol). For example, the air-cooled heat exchanger 56 may be located along an air flow path 59 created by one or more fans 60 (e.g., variable fans) that direct air over coils of the air-cooled heat exchanger 56. When ambient air is at a relatively low temperature, the air directed over the coils may absorb heat from the cooling fluid 58, thereby decreasing a temperature of the cooling fluid 58 and increasing a temperature of the ambient air flowing over the coils of the air-cooled heat exchanger 56. In certain embodiments, the cooling fluid 58 may be received by the air-cooled heat exchanger 56 from a load 62. Therefore, the cooling fluid 58 may ultimately be re-directed toward the load 62 to lower a temperature of the load 62 (e.g., air or fluid that may be directed through a building or a machine).

However, the free cooling system 52 may not be as effective when the temperature of the ambient air is relatively high. For example, an amount of heat transfer occurring between the cooling fluid 58 and the ambient air in the air-cooled heat exchanger 56 may decrease as the temperature of ambient air increases (e.g., the ambient air may not absorb as much heat from the cooling fluid 58 when the ambient air is relatively warm). Therefore, the refrigeration system 12 may include a three-way valve 64 that controls an amount of the cooling fluid 58 that may flow toward the free cooling system 52. For example, the three-way valve 64 may block the cooling fluid 58 from flowing directly toward an evaporator 66 of the mechanical cooling system 54 and simultaneously enable flow through the air-cooled heat exchanger 56 when ambient air temperature is sufficiently below a temperature of the cooling fluid 58 returning from the load 62, such that free-cooling supplies at least a portion of the cooling load demand. The cooling fluid 58 may then flow through the evaporator 66, which can further cool the cooling fluid 58.

As shown in the illustrated embodiment of FIG. 3, the three-way valve 64 may receive the cooling fluid 58 from a pump 65 and select between directing a flow of the cooling fluid 58 toward the evaporator 66 directly from the load 62 or toward the evaporator 66 from the air-cooled heat exchanger 56. In certain embodiments, the three-way valve 64 may include a tee and two, two-way butterfly valves mechanically coupled to an actuator that may adjust a position of the valves (e.g., one butterfly valve opens when the other closes). It should be noted that while the three-way valve 64 is located upstream of the air-cooled heat exchanger 56 in the embodiment of FIG. 3, the three-way valve 64 may be located downstream of the air-cooled heat exchanger 56 in other embodiments. In still further embodiments, the three-way valve 64 may be configured to simultaneously supply and control a flow of the cooling fluid 58 to the air-cooled heat exchanger 56 and to the evaporator 66 directly from the load 62.

When free cooling is able to provide substantially all of the cooling load demand (e.g., when ambient air temperature is below a threshold temperature), the mechanical cooling system 54 does not operate. As such, the cooling fluid 58 flows through the evaporator 66 without experiencing a substantial temperature change (e.g., substantially no heat is transfer from the cooling fluid 58 in the evaporator 66). In some embodiments, the refrigeration system 12 may include a bypass valve 67 to enable the cooling fluid 58 (or a portion of the cooling fluid 58) to bypass the evaporator 66. In certain embodiments, bypassing the evaporator 66 may substantially avoid a pressure drop experienced by the cooling fluid 58 when flowing through the evaporator 66.

When free cooling is unable to provide substantially all of the cooling load demand, the mechanical cooling system 54 may be initiated (e.g., operated either alone or simultaneously with the free cooling system 52). In certain embodiments, the mechanical cooling system 54 may be a vapor-compression refrigeration cycle 68 that includes the evaporator 66, a compressor 70 (e.g., a variable speed compressor), a condenser 72, and/or an expansion device 74, among other components. For example, the mechanical cooling system 54 may be configured to circulate a refrigerant 76, which may be evaporated (e.g., vaporized) in the evaporator 66 via heat transfer with the cooling fluid 58 (e.g., the cooling fluid 58 transfers thermal energy to the refrigerant 76 in the evaporator 66). Therefore, heat may be transferred from the cooling fluid 58 to the refrigerant 76 within the evaporator 66, thereby decreasing a temperature of the cooling fluid 58 (e.g., either in lieu of or in addition to the free cooling system 52). In certain embodiments, the cooling fluid 58 and/or the refrigerant 76 may include glycol (or a mixture of glycol and water). In some embodiments, one or more sets of coils of the condenser 72 may include micro-channel coils.

The air-cooled heat exchanger 56 may include round-tube plate-fin coils with internally enhanced tubes and louvered fins to improve heat transfer. The evaporator 66 may be a brazed-plate, direct-expansion (DX) shell-and-tube heat exchanger, a flooded shell-and-tube heat exchanger, a falling film shell-and-tube heat exchanger, a hybrid falling-film and flooded heat exchanger, or any combination thereof. For embodiments that utilize DX evaporators, the refrigerant is on the tube side and the refrigerant may make multiple passes through the evaporator (e.g., two, three, four or more). For embodiments that utilize evaporators with refrigerant on the shell-side, water or glycol may flow through tubes in with one, two, three, or more passes.

The refrigerant 76 exiting the evaporator 66 may flow toward the compressor 70, which is configured to circulate the refrigerant through the vapor-compression refrigeration cycle 68. Additionally, the compressor 70 may increase a pressure of the refrigerant 76 as the refrigerant 76 circulates (e.g., cycles) through the vapor-compression refrigeration cycle 68. Increasing the pressure of the refrigerant 76 may also increase the temperature of the refrigerant 76, such that the temperature of the refrigerant 76 exiting the compressor 70 is greater than the temperature of the refrigerant 76 entering the compressor 70. Accordingly, it may be desirable to decrease the temperature of the refrigerant 76 so that it may ultimately absorb heat from the cooling fluid 58 in the evaporator 66.

Therefore, the refrigerant 76 exiting the compressor 70 may flow toward the condenser 72. In certain embodiments, the condenser 72 of the mechanical cooling system 54 may be an air-cooled heat exchanger, similar to the air-cooled heat exchanger 56 of the free cooling system 52. In embodiments where the condenser 72 is an air-cooled heat exchanger, the condenser 72 may share the fans 60 with the air-cooled heat exchanger 56. As shown in the illustrated embodiment of FIG. 3, the condenser 72 may be located downstream of the air-cooled heat exchanger 56 with respect to the air flow path 59 so that the cooling fluid 58 may approach the ambient temperature during free cooling. In other embodiments, the condenser 72 may include fans 77 (e.g., variable speed fans) separate from the fans 60 (e.g., FIGS. 4 and 5). In still further embodiments, the condenser 72 of the mechanical cooling system 54 may be any suitable heat exchanger configured to transfer heat from the refrigerant 76 to another medium (e.g., water, air). In any case, the condenser 72 is configured to decrease a temperature of the refrigerant 76 and generally liquefy (e.g., condense) the refrigerant 76.

In certain embodiments, the mechanical cooling system 54 may also include the expansion device 74, which may further decrease a temperature of the refrigerant 76, as well as decrease the pressure of the refrigerant 76. The expansion device 74 may include an expansion valve, a flash tank, an expansion coil, or any other device configured to decrease a pressure of the refrigerant 76 (and decrease a temperature of the refrigerant 76). In other embodiments, the mechanical cooling system 54 may not utilize the expansion device 74.

As discussed above, the cooling fluid 58 may decrease in temperature by flowing through the free cooling system 52 and/or the evaporator 66 of the mechanical cooling system 54. However, when a cooling load demand (e.g., a predetermined and/or desired temperature of the load 62 and/or a predetermined temperature of the cooling fluid 58 exiting the evaporator 66) exceeds an amount that the free cooling system 52 may provide alone, the free cooling system 52 and the mechanical cooling system 54 may operate simultaneously (e.g., a hybrid cooling mode). Accordingly, the cooling fluid 58 may be directed toward the air-cooled heat exchanger 56 of the free cooling system 52, where the cooling fluid 58 may decrease in temperature from a first temperature to a second temperature (e.g., the second temperature is less than the first temperature). Additionally, the cooling fluid 58 may be directed toward the evaporator 66 of the mechanical cooling system 54 upon exiting the air-cooled heat exchanger 56. The cooling fluid 58 may further decrease in temperature from the second temperature to a third temperature (e.g., the third temperature is less than the second temperature, and thus, the first temperature) during the hybrid cooling mode. Upon exiting the evaporator 66, the cooling fluid 58 may be directed toward the load 62, where the cooling fluid 58 may be utilized to cool the load 62.

In certain embodiments, a first portion of the cooling fluid 58 may be directed toward the air-cooled heat exchanger 56 of the free cooling system, while a second portion of the cooling fluid 58 may be directed toward the evaporator 66 of the mechanical cooling system 54 (e.g., via the three-way valve 64). In other embodiments, generally all of the cooling fluid 58 may either flow through the air-cooled heat exchanger 56 before entering the evaporator 66 or directly flow through evaporator 66.

The refrigeration system 12 may include a controller 78 that may adjust a position of the three-way valve 64, a position of the bypass valve 67, a speed of the one or more fans 60, a speed of the one or more fans 77 (e.g., FIG. 5), a speed of the compressor 70, and/or any other operating conditions that may affect a temperature of the cooling fluid 58 supplied to the load 62. Accordingly, the refrigeration system 12 may include one or more sensors that may monitor the operating conditions of the refrigeration system 12. For example, the refrigeration system 12 may include a return cooling fluid temperature sensor 81, a supply cooling fluid temperature sensor 83, a suction pressure sensor 85, a discharge pressure sensor 87, and/or an ambient temperature sensor 89. The temperature and/or pressure sensors may provide feedback to the controller 78, which may then adjust a position of the three-way valve 64, a position of the valve 67, a speed of the one or more fans 60, a speed of the one or more fans 77 (FIG. 5), and/or a speed of the compressor 70 based on the feedback received from the one or more sensors.

In certain embodiments, the controller 78 may include a processor 80 and a memory 82. For example, the controller 78 may include non-transitory code or instructions stored in a machine-readable medium (e.g., the memory 82) that is used by a processor (e.g., the processor 80) to implement the techniques disclosed herein. The memory 82 may store computer instructions that may be executed by the processor 80. Additionally, the memory 82 may store experimental data and/or other values relating to predetermined operating conditions of the refrigeration system 12. The controller 78 may monitor and control the operation of the refrigeration system 12, for example, by adjusting a position of the three-way valve 64, a position of the valve 67, a speed of the one or more fans 60, a speed of the one or more fans 77, and/or a speed of the compressor 70 based on the feedback received from the one or more sensors. The controller 78 of the refrigeration system 12 may be configured to perform instructions that may enhance an efficiency of the refrigeration system 12. Such instructions are discussed in more detail herein with reference to FIG. 6.

Figure 4:
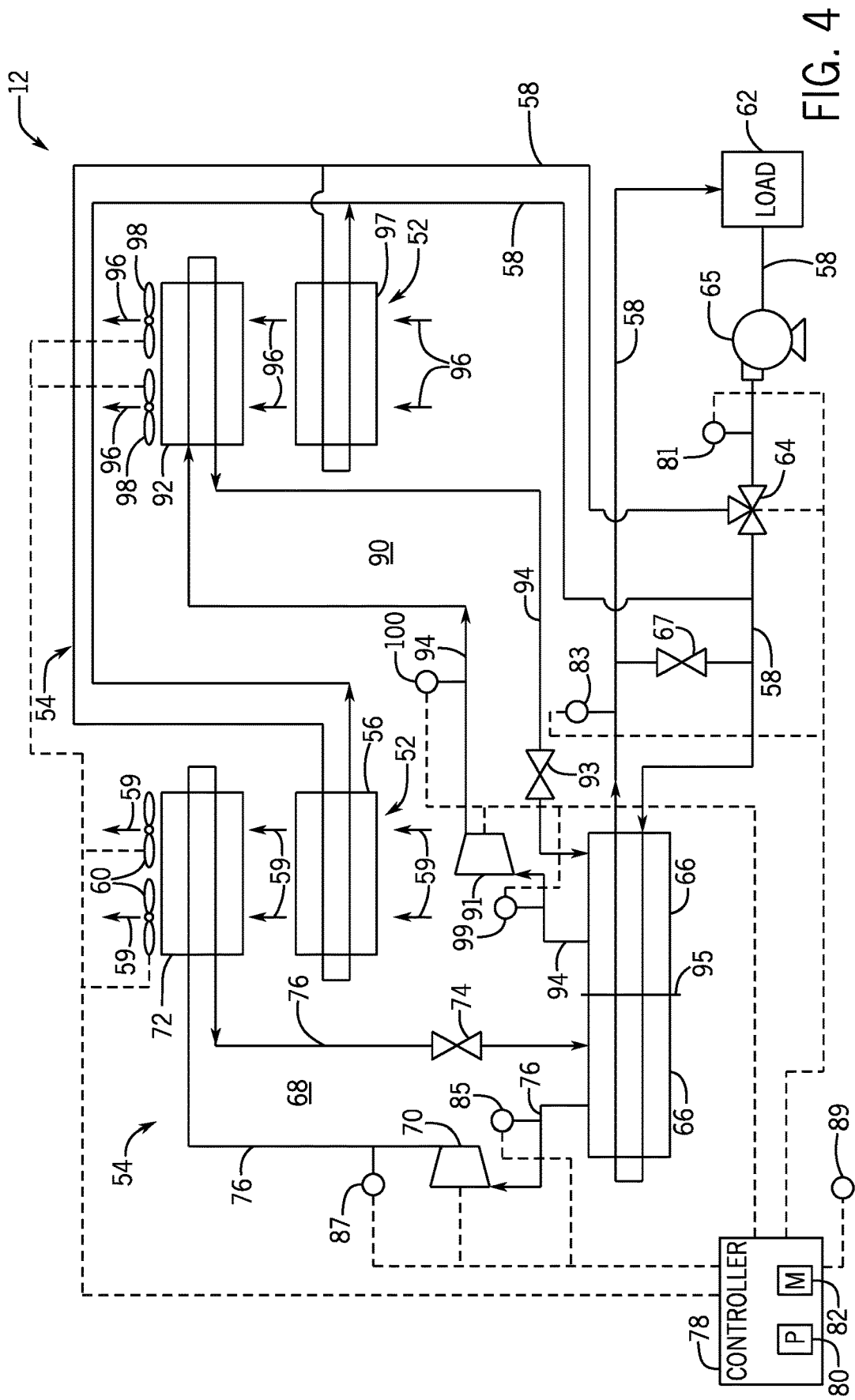
FIG. 4 is a block diagram of an embodiment of a refrigeration system that includes an additional mechanical cooling system, in accordance with an aspect of the present disclosure.

FIG. 4 is a block diagram of the refrigeration system 12 where the mechanical cooling system 54 includes a second vapor compression refrigeration cycle 90. The second vapor compression refrigeration cycle 90 may include a second compressor 91 (e.g., a variable speed compressor or a fixed speed compressor), a second condenser 92, and a second expansion device 93. In some embodiments, the compressor 70 may be a variable speed compressor and the second compressor 91 may be a fixed speed compressor. However, in other embodiments, the compressor 70 and the second compressor 91 may be any suitable combination of variable speed compressors and fixed speed compressors that will enable the refrigeration system 12 to operate at a minimum energy input. Additionally, the second vapor compression refrigeration cycle 90 may be configured to direct a refrigerant 94 through the evaporator 66 to provide additional cooling when the cooling load demand is relatively high. The second vapor compression refrigeration cycle 90 may be configured to operate in substantially the same manner as the vapor compression refrigeration cycle 68 to provide cooled refrigerant 94 to the evaporator 66, where the cooled refrigerant 94 may absorb heat from the cooling fluid 58. In some embodiments, the refrigerant 94 may be the same fluid as the refrigerant 76 (e.g., water, glycol, and/or a mixture of water and glycol). In other embodiments, the refrigerant 94 may be different than the refrigerant 76.

As shown in FIG. 4, the two refrigerant circuits 68 and 90 share a single evaporator 66. In this embodiment the evaporator 66 includes a shell-and-tube heat exchanger with refrigerant on a shell-side and water or glycol on a tube-side. A partition 95 separates the two refrigerant circuits 68 and 90 and serves as a tube sheet between the two circuits 68 and 90. In other embodiments, DX evaporators or brazed-plate evaporators may be utilized when multiple refrigerant circuits 68 and 90 are included in the refrigeration system 12.

As shown in the illustrated embodiment of FIG. 4, the second condenser 92 may be positioned in a separate air flow path 96 from the condenser 72. A second air-cooled heat exchanger 97 may be positioned along the air flow path 96 and share fans 98 (e.g., variable speed fans) with the second condenser 92. In this embodiment, the air stream 59 is drawn from the ambient environment through air-cooled heat exchanger 59, condenser 72, and fans 60 and then discharged upward (e.g., out of the refrigeration system 12). Likewise, the air flow path 96 is drawn from the ambient environment through the second air-cooled heat exchanger 97, the second condenser 92, and the fans 98 and then discharged upward (e.g., out of the refrigeration system 12). In other embodiments, the condenser 72, the second condenser 92, and the air-cooled heat exchanger 56 may be positioned in any suitable arrangement to meet the cooling load demand. In still further embodiments, one or more of the condenser 72, the second condenser 92, and the air-cooled heat exchanger 56 may share fans (e.g., the condenser 72, the second condenser 92, and/or the air-cooled heat exchanger 56 are positioned in the same air flow path) such that ambient air flows through the air-cooled heat exchanger 56, the condenser 72, the second condenser 92, and the fans 60 in a series flow configuration.

Additionally, the controller 78 may be communicatively coupled to a second suction pressure sensor 99 and a second discharge pressure sensor 100 to monitor a pressure of the refrigerant 94 entering and exiting the second compressor 91 (e.g., similar to the suction pressure sensor 85 and the discharge pressure sensor 87 for the compressor 70). In some embodiments, the pressure of the refrigerant 94 entering and exiting the second compressor 91 may enable the controller 78 to determine whether to increase and/or decrease a speed of the second compressor 91.

Figure 5:
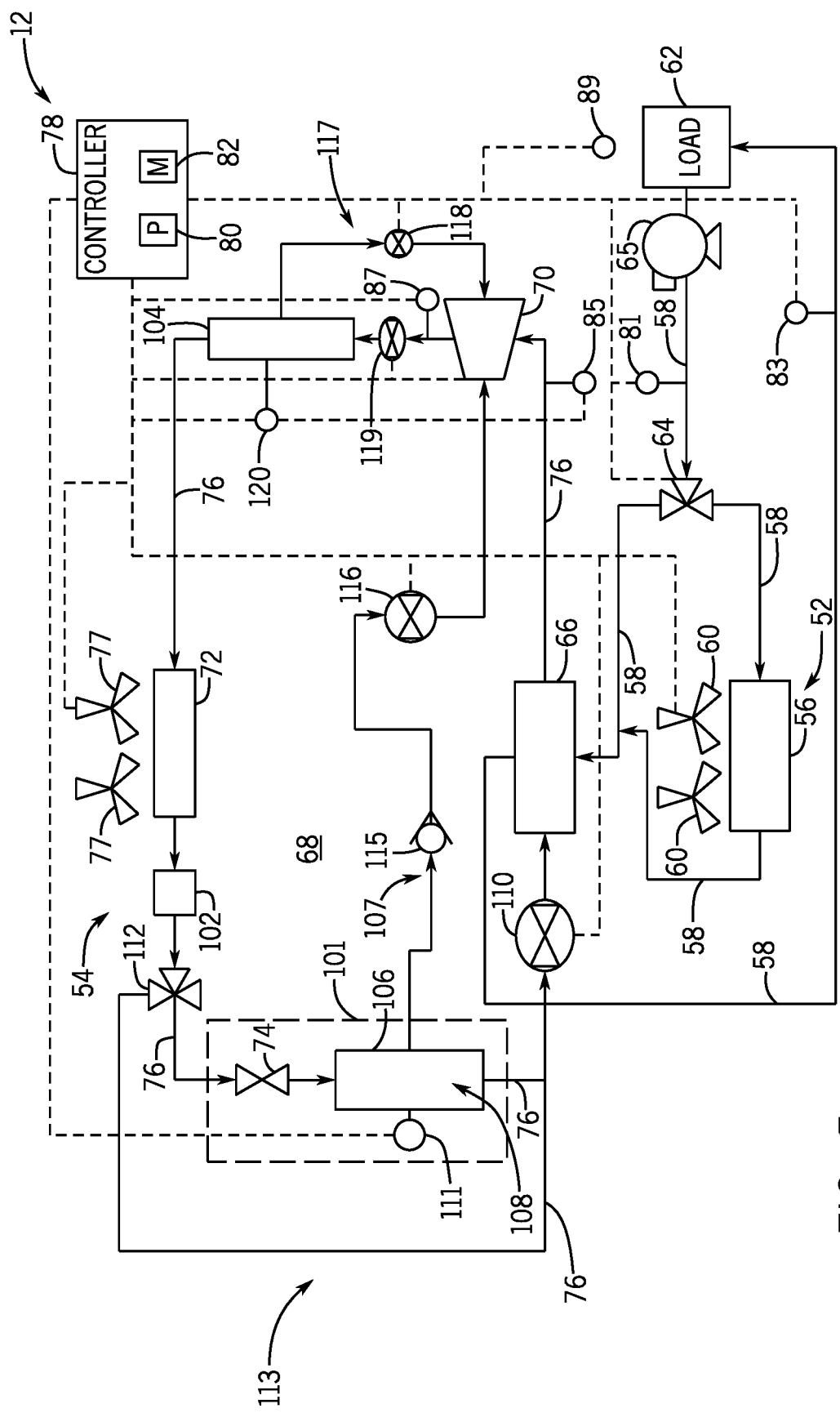
FIG. 5 is a block diagram of a refrigeration system that includes an economizer, a filter, and additional valves, in accordance with an aspect of the present disclosure.

The refrigeration system 12 may additionally include an economizer 101, a filter 102, an oil separator 104 and/or additional valves that may provide enhanced control and ability to cool the load 62, and thereby enhance the efficiency of the refrigeration system 12. For example, FIG. 5 is a block diagram of the refrigeration system 12 that includes such additional devices. As shown in the illustrated embodiment of FIG. 5, the vapor compression refrigeration cycle 68 includes the economizer 101. The economizer 101 may include the expansion device 74 as well as a flash tank 106. In certain embodiments, the flash tank 106 may receive the refrigerant 76 from the expansion device 74 at a relatively low pressure and low temperature. The flash tank 106 may be a vessel that is configured to rapidly lower the pressure of the refrigerant 76 even further to separate any vaporous refrigerant from condensed refrigerant. Accordingly, a first portion of the refrigerant 76 may vaporize (e.g., change from liquid to vapor) as a result of the rapid expansion within the flash tank 106. In some embodiments, the first portion of the refrigerant 76 that vaporizes may bypass the evaporator 66 and be directed toward the compressor 70 via a bypass circuit 107. Additionally, a second portion of the refrigerant 76 may remain in liquid form and collect at a bottom 108 of the flash tank 106. In some embodiments, a valve 110 may be included downstream of the flash tank 106 and upstream of the evaporator 66, such that a flow of the second portion of refrigerant 76 may be adjusted based on other operating conditions of the refrigeration system 12. For example, when the condenser 72 reduces a temperature of the refrigerant 76 to a level such that the first portion exiting the flash tank 106 is substantially less than the second portion, the valve 110 may be adjusted to increase the flow of the second portion of the refrigerant 76 directed toward the evaporator 66 so that more refrigerant 76 is evaporated in the evaporator 66 and directed toward the compressor 70.

Additionally, the flash tank 106 may include a liquid level sensor 111 that may monitor an amount of the second portion of the refrigerant 76 (e.g., liquid portion) collected in the bottom 108 of the flash tank 106. The liquid level sensor 111 may be communicatively coupled to the controller 78 to provide feedback to the controller 78 regarding the amount of liquid collected in the flash tank 106. In certain embodiments, the controller 78 may be configured to perform an output, function, or command based on the feedback received from the liquid level sensor 111. For example, in certain embodiments, a three-way valve 112 may be located between the condenser 72 and the economizer 101. Therefore, when the liquid level in the flash tank 106 is above a threshold level, the three-way valve 112 may be adjusted to direct the refrigerant 76 toward the evaporator 66 along a bypass circuit 113, thereby bypassing the economizer 101 (e.g., the temperature of the refrigerant is too low, and thus the additional cooling provided by the economizer 101 may not be desired). Additionally, when the liquid level in the flash tank 106 is below a predetermined level, the three-way valve 112 may enable all or a substantial portion of the refrigerant 76 to incur additional cooling in the economizer 101 by closing off the bypass circuit 113.

As shown in the illustrated embodiment of FIG. 5, the vapor compression refrigeration cycle 68 may also include a check valve 115 disposed along the bypass circuit 107 that may block the first portion of the refrigerant 76 from flowing from the compressor 70 toward the flash tank 106. Accordingly, the first portion of the refrigerant 76 (e.g., vaporous refrigerant) may be directed from the flash tank 106 toward the compressor 70, where the pressure of the first portion of the refrigerant 76 may increase. Additionally, the first portion of the refrigerant 76 may be blocked from flowing from the compressor 70 back toward the flash tank 106 because of the check valve 115. Additionally or alternatively, a valve 116 may be included between the flash tank 106 and the compressor 70 such that a flow of the first portion of the refrigerant 76 may be adjusted by the controller 78 (e.g., via an actuator configured to adjust a position of the valve 116). It may be desirable to control the flow of the first portion of the refrigerant 76 from the flash tank 106 toward the compressor 70 because the compressor 70 may include a predetermined capacity (e.g., based on compressor speed) that governs a rate of the refrigerant 76 that may be compressed. Accordingly, when the compressor 70 is near the predetermined capacity, the controller 78 may adjust the valve 116 to decrease a flow rate of the first portion of the refrigerant 76 flowing toward the compressor 70. Similarly, when the compressor is operating generally below capacity, the controller 78 may adjust the valve 116 to increase the flow of the first portion of the refrigerant 76 flowing toward the compressor 70.

Additionally, the vapor compression refrigeration cycle 68 may include the filter 102 that may be utilized to remove contaminants from the refrigerant 76. In certain embodiments, acids and/or oil may become mixed with the refrigerant 76 that cycles through the vapor-compression refrigeration cycle 68. Accordingly, the filter 102 may be configured to remove such contaminants from the refrigerant 76 such that the refrigerant 76 entering the expansion device 74, the flash tank 106, the compressor 70, and/or the evaporator 66 includes minimal contaminants.

The vapor compression refrigeration cycle 68 may also include the oil separator 104, which may be positioned downstream of the compressor 70 and upstream of the condenser 72, for example. The oil separator 104 may be utilized to remove oil that may be collected in the refrigerant 76 when flowing through the compressor 70. Accordingly, any oil removed within the oil separator 104 may be returned from the oil separator 104 to the compressor 70 via a recirculation circuit 117. Additionally, oil removed from the refrigerant 76 may collect within the oil separator 104. As such, a valve 118 may be positioned along the recirculation circuit 117 to control a flow and/or pressure of the oil flowing toward the compressor 70. Therefore, the amount of oil returned to the compressor 70 may be adjusted by the controller 78 (e.g., via an actuator configured to adjust a position of the valve 118). In certain embodiments, the oil separator 104 may be a flash vessel, a membrane separator, or any other device configured to separate oil from the refrigerant 76 (e.g., water and/or glycol).

Additionally, a valve 119 may be positioned between the compressor 70 and the oil separator 104 to control an amount of the refrigerant 76 flowing toward the oil separator 104. In some cases, the oil separator 104 may include an oil level monitoring device (e.g., an oil level sensor 120) that may enable the controller 78 and/or an operator to determine how much oil has collected in the oil separator 104. When an amount of oil in the oil separator 104 exceeds a predetermined threshold level, the controller 78 may adjust a position of the valve 119 to decrease a flow of the refrigerant 76 toward the oil separator 104. In some embodiments, the controller 78 may also adjust a position of the valve 118 to increase the amount of oil returned to the compressor 70 from the oil separator 104. Accordingly, the level of oil in the oil separator 104 may decrease, thereby enabling more of the refrigerant 76 to flow toward the oil separator 104, and thus, toward the condenser 72. While the present discussion focuses on the vapor compression refrigeration cycle 68, it should be noted that the second vapor compression refrigeration cycle 90 may also include an economizer, a filter, an oil separator and/or the additional valves and components discussed with reference to FIG. 5.

Figure 6:
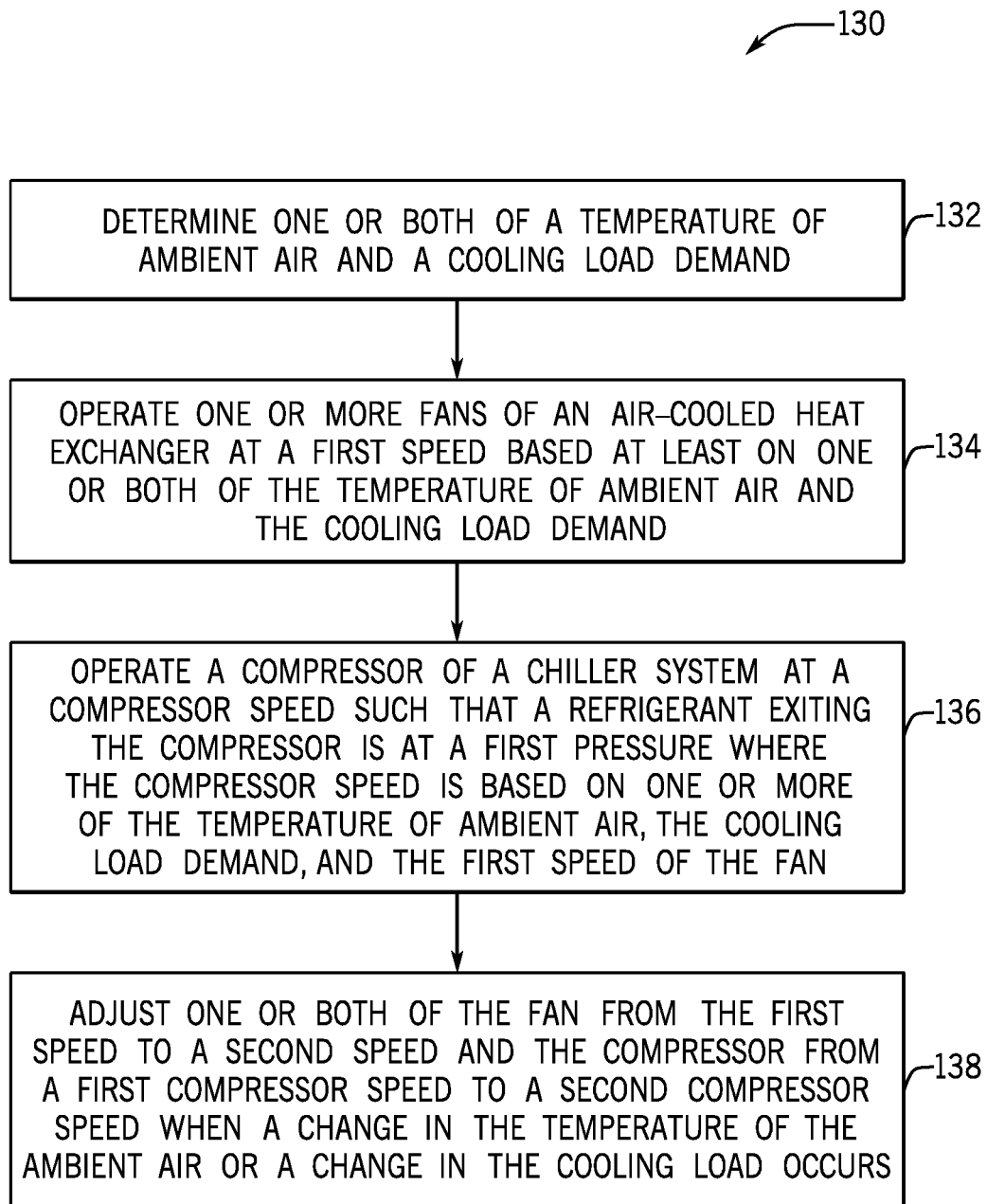
FIG. 6 is a block diagram of a process that may be utilized to enhance the efficiency of a refrigeration system, in accordance with an aspect of the present disclosure.

To enhance an efficiency of the refrigeration system 12, it may be desirable to operate the compressor 70 (and/or the second compressor 91) before the one or more fans 60 reach a maximum speed (e.g., the speed at which the one or more fans 60 cannot spin any faster and/or a predetermined maximum speed specified by the manufacturer). In some cases, operating the compressor 70 (and/or the second compressor 91) before the one or more fans 60 reach the maximum speed may enhance the efficiency of the refrigeration system 12. For example, FIG. 6 is a block diagram of a process 130 that may be utilized to enhance the efficiency of the refrigeration system 12.

At block 132, the controller 78 may determine a temperature of the ambient air (e.g., air in the surrounding environment of the refrigeration system 12) and/or a cooling load (e.g., load 62) demand. For example, the controller 78 may be communicatively coupled to the ambient air temperature sensor 89 that monitors an ambient air temperature. Additionally, the controller 78 may be communicative coupled to the return cooling fluid temperature sensor 81 and/or to the supply cooling fluid temperature sensor 83 to determine a cooling load demand. As used herein, the ambient air temperature may be a temperature of air in an environment surrounding the refrigeration system 12. Additionally, the cooling load demand may be based on a difference between a predetermined or desired temperature of the load 62 (e.g., a temperature received from a user interface) and an actual temperature of the load 62 (e.g., a temperature received from a sensor monitoring the load 62) and/or a temperature difference between a desired temperature of the cooling fluid 58 supplied to or returned from the load 62 (e.g., received from the user interface) and an actual temperature of the cooling fluid 58 supplied to or returned from the load 62 (e.g., a temperature received from the return cooling fluid temperature sensor 82 or the supply cooling fluid temperature sensor 83).

At block 134, the controller 78 may be configured to operate the one or more fans 60 of the air-cooled heat exchanger 56 at a first speed based at least on the temperature of ambient air and/or the cooling load demand. Accordingly, the controller 78 may be configured to calculate (e.g., via the processor 80) the first speed of the fan based on the feedback received from the one or more sensors. The first speed of the one or more fans 60 may increase as the cooling load demand increases and/or as the ambient air temperature increases. Conversely, the first speed may decrease as the cooling load demand decreases (e.g., when the actual temperature of the load is less than the predetermined temperature of the load when cooling) and/or when the ambient air temperature decreases.

In certain embodiments, the one or more fans 60 may include a maximum speed (e.g., a speed at which the one or more fans 60 cannot physically exceed). However, it is now recognized that it may not be desirable to increase the speed of the one or more fans 60 to the maximum speed. Rather, operating and/or increasing a pressure of the compressor 70 when the ambient air temperature increases and/or when the cooling load demand increases may reduce power input to the refrigeration system 12. Therefore, the memory 82 of the controller 78 may be configured to calculate (e.g., using an algorithm) a threshold speed of the one or more fans 60, which may be below the maximum speed of the one or more fans 60. For example, the threshold speed of the one or more fans 60 may be between 50% and 99% of the maximum speed, between 70% and 95% of the maximum speed, or between 80% and 90% of the maximum speed. In some embodiments, the controller 78 may utilize Equation 1 below to calculate the threshold fan speed during free-cooling only mode.

$$\text{Threshold Speed} = \{[d1 \times (\text{ECHLT} - T_{amb})^2] + d0\} \times \text{FanFactor1} \quad (1)$$

In Equation 1, d1 and d0 may represent predetermined factors that are specific to the air-cooled heat exchanger 56. Additionally, ECHLT represents the entering chilled liquid temperature (ECHLT), or the temperature of the cooling fluid 58 directed toward the load 62 from the evaporator 66 (e.g., the temperature received from the supply cooling fluid temperature sensor 83). $T_{amb}$ is the ambient air temperature, and FanFactor1 is a programmable factor that may be specific to the air-cooled heat exchanger 56.

For operation in free-cooling only mode, the controller modulates fan speed to maintain leaving chilled liquid temperature near a predetermined setpoint. As load and/or ambient temperature increase, the controller increases the speed of the fans 60 until they reach the threshold speed. At the threshold speed, the controller 78 may block an increase of the speed of the one or more fans 60 beyond the threshold speed. Any further increase in load or ambient temperature or other operating condition that results in a corresponding increase of the leaving chilled water temperature above the setpoint value causes the controller to initiate operation of one or more compressors (e.g., variable speed compressors). As shown by Equation 1, the threshold speed may be different for various operating conditions (e.g., a different threshold speed for various combinations of ambient air temperature and/or cooling load). The speed of the compressor 70 (and/or the second compressor 91) may be determined by the controller 78 using algorithms known in the art, such that the cooling load demand may be achieved by the refrigeration system 12.

When the one or more fans 60 reach the threshold speed, the controller 78 may also be configured to operate the compressor 70 (and/or the second compressor 91) of the mechanical cooling system 54 at a first compressor speed, as shown at block 136. In certain embodiments, the first compressor speed of the compressor 70 may be a speed that achieves the cooling load demand and also reduces an amount of energy input to the refrigeration system 12 (e.g., a minimum amount of energy is input). Additionally, the controller 78 may be configured to determine a second speed of the one or more fans 60 when the compressor 70 (and/or the second compressor 91) is operating. In other words, when the compressor 70 operates, it may not be desirable to continue operating the one or more fans at the threshold speed. For example, the controller 78 may be configured to determine the second speed based on Equation 2.

$$\text{Second Speed} = b1 \times \text{Unit Total Load Per Fan} + b2 \times \text{FanFactor2} \tag{2}$$

Therefore, the second speed (e.g., the speed of the one or more fans 60 during a hybrid mode of operation) may be based on a unit total load per fan (e.g., an amount of free cooling and mechanical cooling performed by a fan of the one or more fans 60). Accordingly, the controller 78 may be configured to determine the unit total load per fan, which may be based on the entering chilled liquid temperature (ECHLT), the ambient temperature ($T_{amb}$), a free cooling capacity of each fan, a mechanical cooling capacity of each fan, and the number of fans included in the refrigeration system 12, among others. The factors b1, b2, and FanFactor2 may be predetermined to minimize total energy use of the compressor(s) 70 and/or 91 and the fans 60 based on experimental data and/or based on information specific to the refrigeration system 12 (e.g., provided by a manufacturer). The unit total load per fan may be estimated from a mechanical cooling capacity provided by the compressors 70 and/or 91 plus a free-cooling capacity provided from the air-cooled heat exchanger 56.

The second speed represents an estimated fan speed that may minimize total energy use of the compressors 70 and/or 91 and the fans 60. In some cases, it may be desirable to adjust the fan speed for a particular refrigerant circuit 68 and/or 90 based on the second sped to maintain a compressor oil pressure, a compressor suction pressure, a compressor discharge pressure, and/or other operating conditions within acceptable control limits.

In certain embodiments, the compressor 70 may operate when the one or more fans 60 reach the threshold speed, when the ambient air temperature reaches a predetermined value, and/or when the cooling load demand reaches a predetermined value. Accordingly, the controller 78 may determine the first compressor speed of the compressor 70 (and/or a speed of the second compressor 91) based on the leaving chilled liquid temperature the second speed of the one or more fans 60, the ambient air temperature, and/or the cooling load demand. In other embodiments, the compressor 70 (and/or the second compressor 91) may not be operated until the one or more fans 60 reach the threshold speed. In any case, simultaneously operating the one or more fans 60 below the maximum speed and the compressor 70 may decrease an amount of power consumed by the refrigeration system 12, which may enhance an efficiency of the refrigeration system.

In some cases, the operating conditions (e.g., ambient air temperature and/or cooling load demand) may change during operation of the refrigeration system. Accordingly, at block 138, the controller 78 may be configured to adjust the speed of the one or more fans 60, the compressor speed of the compressor 70, and/or the compressor speed of the second compressor 91 to account for changes in the operating conditions. Additionally, the controller 78 may be configured to switch between different operating modes of the refrigeration system 12 (e.g., see FIG. 7). As a non-limiting example, when the refrigeration system 12 is located in an outdoor environment, the ambient air temperature may decrease during the night and increase during the day (e.g., as a result of sunshine or a lack of sunshine). Therefore, during a hybrid cooling mode of operation that utilizes the one or more fans 60 of the air-cooled heat exchanger 56 and the compressor 70, the controller 78 may be configured to decrease the speed of the one or more fans 60 from the first speed to a second speed (e.g., the second speed is less than the first speed) and/or decrease the compressor speed of the compressor 70 from the first compressor speed to a second compressor speed (e.g., the second compressor speed is less than the first compressor speed) at night. Similarly, as the ambient air temperature increases during the day, the controller 78 may be configured to increase the speed of the one or more fans 60 from the first speed and/or the second speed to a third speed (e.g., the third speed is greater than the first speed and/or the second speed) and/or to increase the compressor speed of the compressor 70 from the first compressor speed and/or the second compressor speed to a third compressor speed (e.g., the third compressor speed is greater than the first compressor speed and/or the second compressor speed).

Additionally, the controller 78 may be configured to adjust the speed of the one or more fans 60 and/or the speed of the compressor 70 (and/or the second compressor 91) when the cooling load demand increases and/or decreases. In any event, the controller 78 may be configured to determine the speed of the one or more fans 60 and the compressor speed of the compressor 70 (and/or the second compressor 91) by calculating the combination of the speed of the one or more fans 60 and the compressor speed of the compressor 70 (and/or the speed of the second compressor 91) that substantially or generally minimizes the amount of power input to the refrigeration system 12 (e.g., see Equation 2). Accordingly, the efficiency of the refrigeration system 12 may be enhanced.

Figure 7:
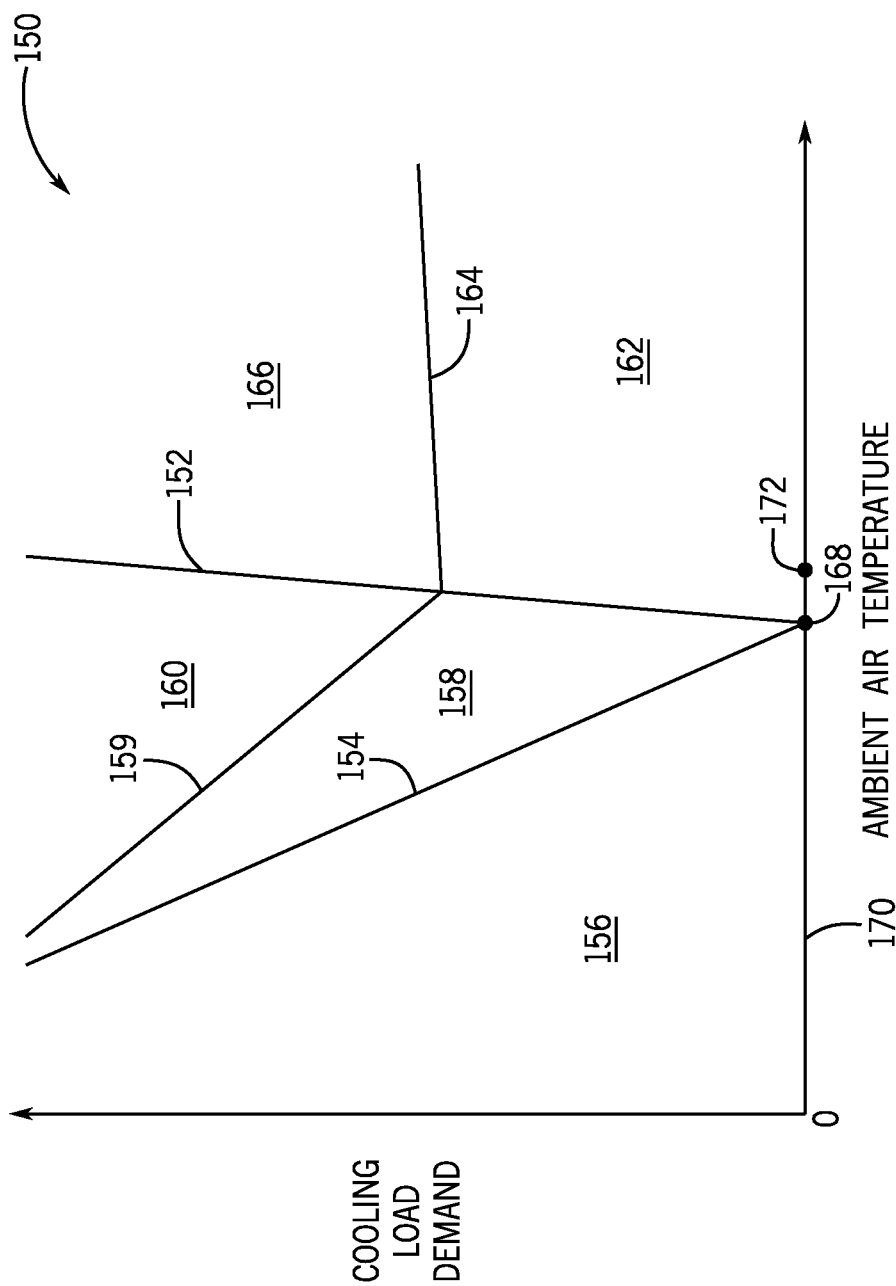
FIG. 7 is a graphical representation of ambient temperature as a function of cooling load demand for various modes of operation of a refrigeration system, in accordance with an aspect of the present disclosure.

FIG. 7 is a graphical representation 150 of ambient air temperature as a function of cooling load demand at various modes of operation of the refrigeration system 12. The graphical representation assumes a constant leaving chilled liquid temperature (LCHLT) (e.g., a temperature received from the return cooling fluid temperature sensor 81) and flow rate. Accordingly, the graphical illustration 150 shows when the refrigeration system 12 may operate in a given mode based at least on the ambient air temperature and cooling load demand. As shown in the illustrated embodiment of FIG. 7, when the ambient air temperature is below a threshold temperature line 152, the free-cooling system 52 may be operated. In certain embodiments, the threshold temperature line 152 may represent the ambient air temperature at which free-cooling may still be effective for absorbing heat from the cooling fluid 58 based on a measured return chilled liquid temperature, a measured ambient air temperature, and/or other operating parameters. Further, when the ambient air temperature is below a second threshold temperature line 154, the refrigeration system 12 may operate in a free-cooling only mode 156. The second threshold temperature line 154 may represent the ambient air temperature at which the cooling load demand may be achieved without utilizing the mechanical cooling system 54 and/or without operating the one or more fans 60 above the threshold speed.

When the ambient air temperature exceeds the second threshold temperature line 154 but is below the threshold temperature line 152, the controller 78 may be configured to operate the compressor 70 of the vapor compression refrigeration cycle 68 in a first hybrid cooling mode 158. In the first hybrid cooling mode 158, the amount of cooling performed by the free-cooling system 52 and the vapor compression refrigeration cycle 68 achieves the cooling load demand. However, in some cases, the ambient air temperature may be below the threshold temperature line 152, but the free-cooling system 52 and the vapor compression refrigeration cycle 68 may not be able to achieve the cooling load demand (e.g., when the cooling load demand exceeds a cooling load demand threshold line 159). Therefore, the second compressor 91 of the second vapor compression refrigeration cycle 90 may be operated in addition to the air-cooled heat exchanger 56 and the compressor 70 of the vapor compression refrigeration cycle 68 to achieve the desired level of cooling. In such cases, the refrigeration system 12 may operate in a second hybrid cooling mode 160.

As the ambient air temperature increases above the threshold temperature line 152, the free-cooling system 52 may consume energy without providing any substantial amount of cooling. Therefore, power supplied to the one or more fans 60 may be blocked and a first mechanical cooling only mode 162 may be performed. The first mechanical cooling only mode 162 may operate the compressor 70 of the vapor compression refrigeration cycle 68 to cool the cooling fluid 58 flowing through the evaporator 66. The first mechanical cooling only mode 162 may achieve the desired level of cooling below a second cooling load demand threshold line 164. Thus, when the cooling load demand exceeds the second cooling load demand threshold line 164 (and the ambient air temperature exceeds the temperature threshold line 152) a second mechanical cooling only mode 166 may be initiated by the controller 78. The second mechanical cooling only mode 166 may operate both the compressor 70 of the vapor compression refrigeration cycle 68 and the second compressor 91 of the second vapor compression refrigeration cycle 90 in order to achieve the cooling load demand.

In certain embodiments, the temperature threshold line 152 and the second temperature threshold line 154 may intersect at a point 168 along an axis 170 representative of the ambient air temperature. The point 168 may be less than a point 172 representative of the LCHLT, such that heat may be transferred from the cooling fluid 58 to the ambient air.

One or more of the disclosed embodiments, alone or in combination, may provide one or more technical effects useful in enhancing an efficiency of a refrigeration system that includes a free cooling system and a mechanical cooling system. In general, embodiments of the present disclosure include operating a compressor of the mechanical cooling system when one or more fans of the free cooling system are operating below a maximum speed. In some cases, operating the compressor and the fans of the free cooling system at a speed below the maximum speed may consume less power than operating the compressor and/or the fans at the maximum speed. Accordingly, power input to the refrigeration system may be decreased, and an efficiency of the refrigeration system may be enhanced. The technical effects and technical problems in the specification are exemplary and are not limiting. It should be noted that the embodiments described in the specification may have other technical effects and can solve other technical problems.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A refrigeration system, comprising:
    a free cooling system comprising an air-cooled heat exchanger, wherein the air-cooled heat exchanger comprises a fan configured to move air over coils of the air-cooled heat exchanger to remove heat from a coolant flowing through the air-cooled heat exchanger;
    a mechanical cooling system comprising a refrigerant loop with an evaporator, a variable speed compressor, and a condenser disposed along the refrigerant loop, wherein the variable speed compressor is configured to circulate a refrigerant through the refrigerant loop, and wherein the evaporator is configured to receive the coolant and to transfer heat from the coolant to the refrigerant; and
    a controller configured to adjust a fan speed of the fan up to a threshold fan speed and to begin the variable speed compressor in response to the fan speed reaching the threshold fan speed, wherein the threshold fan speed is determined by the controller based on an ambient air temperature or a temperature of the coolant exiting the evaporator, wherein the fan speed and a compressor speed of the variable speed compressor are based at least on the ambient air temperature and a cooling load demand, and wherein the threshold fan speed is less than a maximum speed of the fan.

2. The refrigeration system of claim 1, wherein the controller is configured to adjust the fan speed and the compressor speed to achieve a desired cooling load demand.

3. The refrigeration system of claim 1, wherein the free cooling system, the mechanical cooling system, and the controller are packaged in a single unit, such that the refrigeration system is an autonomous unit.

4. The refrigeration system of claim 1, wherein the controller is configured to adjust the compressor speed and to maintain the fan speed at the threshold fan speed in response to the fan speed reaching the threshold fan speed.

5. The refrigeration system of claim 1, wherein the controller is configured to adjust the fan speed to zero in response to the ambient air temperature reaching a threshold temperature.

6. The refrigeration system of claim 1, wherein the condenser of the refrigerant loop comprises an air-cooled condenser.

7. The refrigeration system of claim 6, wherein the air-cooled condenser is downstream of the air-cooled heat exchanger with respect to a flow of the air.

8. The refrigeration system of claim 1, comprising a temperature sensor configured to monitor the ambient air temperature and to provide the ambient air temperature as feedback to the controller.

9. The refrigeration system of claim 1, wherein the mechanical cooling system comprises an additional refrigerant loop with an additional variable speed compressor and an additional condenser disposed along the additional refrigerant loop, wherein the additional variable speed compressor is configured to circulate an additional refrigerant through the additional refrigerant loop, and wherein the additional refrigerant is configured to flow into the evaporator and to absorb heat from the coolant.

10. The refrigeration system of claim 1, wherein the fan is a variable speed fan.

11. A refrigeration system controller, comprising:
a memory configured to store instructions for operating a free-cooling system and a mechanical cooling system;
a processor configured to execute the instructions, wherein the instructions comprise:
determining one or both of a temperature of ambient air and a cooling load demand;
operating a fan of an air-cooled heat exchanger at a first speed based at least on one or both of the temperature of ambient air and the cooling load demand;
adjusting the first speed of the fan based on changes of at least one or both of the temperature of ambient air and the cooling load demand; and
beginning a variable speed compressor of the mechanical cooling system in response to the first speed reaching a threshold speed, wherein the threshold speed is determined by the refrigeration system controller based at least on the temperature of ambient air, wherein the variable speed compressor is configured to operate at a compressor speed based on one or more of the temperature of ambient air, the cooling load demand, and the first speed of the fan before operating the fan at a maximum speed.

12. The refrigeration system controller of claim 11, wherein the instructions comprise adjusting the first speed of the fan to zero in response to the temperature of ambient air reaching a threshold temperature.

13. The refrigeration system controller of claim 12, wherein the instructions comprise bypassing the air-cooled heat exchanger in response to the temperature of ambient air exceeding the threshold temperature.

14. The refrigeration system controller of claim 12, wherein the threshold temperature is less than a temperature of a cooling fluid returning from a load.

15. The refrigeration system controller of claim 11, wherein the threshold speed is a predetermined threshold speed less than the maximum speed.

16. The refrigeration system controller of claim 11, comprising a temperature sensor configured to monitor the ambient air temperature and to provide the ambient air temperature as feedback to the refrigeration system controller.

17. The refrigeration system controller of claim 11, wherein the instructions comprise adjusting one or both of the first speed of the fan and the compressor speed to achieve the cooling load demand.

18. The refrigeration system controller of claim 11, wherein the instructions comprise maintaining the fan at the threshold speed and adjusting the compressor speed to achieve the desired cooling load demand.

19. The refrigeration system controller of claim 11, wherein the threshold speed is determined by the refrigeration system controller based on a temperature of a coolant exiting an evaporator.

20. A method, comprising:
determining one or both of a temperature of ambient air and a cooling load demand;
operating a variable speed fan of an air-cooled heat exchanger at a first speed based at least on one or both of the temperature of ambient air and the cooling load demand;
adjusting the first speed of the variable speed fan based on changes of at least one or both of the temperature of ambient air and the cooling load demand; and
beginning a variable speed compressor of the mechanical cooling system in response to the first speed reaching a threshold speed, wherein the variable speed compressor is configured to operate at a compressor speed based on one or more of the temperature of ambient air, the cooling load demand, and the first speed of the variable speed fan before operating the variable speed fan at a maximum speed.

21. The method of claim 20, comprising adjusting the first speed of the fan to zero in response to the temperature of ambient air reaching a threshold temperature.

22. The method of claim 21, comprising bypassing the air-cooled heat exchanger in response to the temperature of ambient air exceeding the threshold temperature.

23. The method of claim 20, comprising adjusting an additional compressor speed of an additional variable speed compressor in response to the cooling load demand reaching a threshold cooling load demand.

24. The method of claim 20, comprising adjusting the first speed of the fan while adjusting the compressor speed to achieve the cooling load demand.

25. The method of claim 20, wherein the threshold speed is determined by a controller based on the temperature of ambient air or a temperature of a coolant exiting an evaporator.

* * * * *